Figure 1:
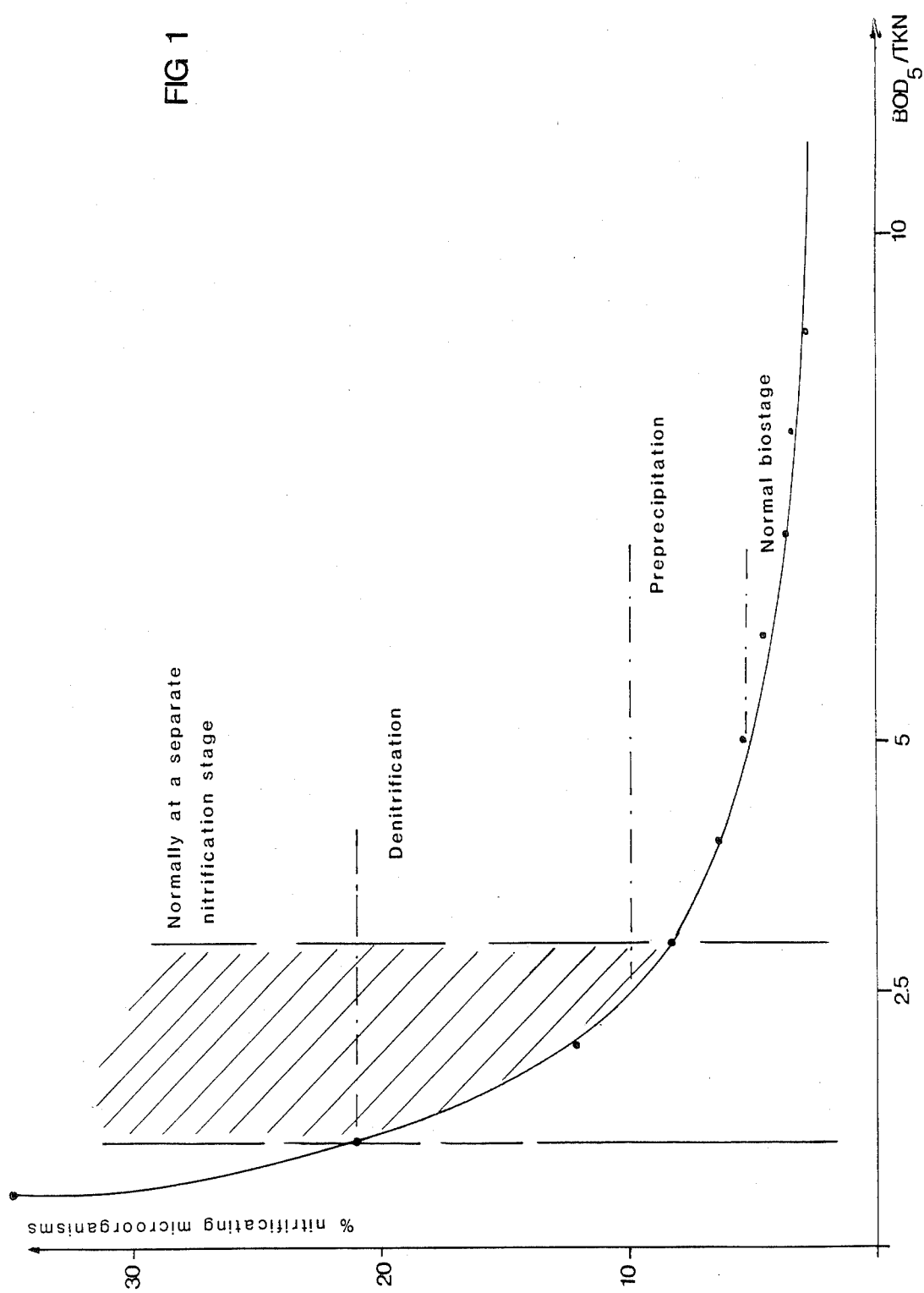

United States Patent [19]

Karlsson

[11] Patent Number: 4,732,679

[45] Date of Patent: Mar. 22, 1988

[54] SEWAGE-WATER PURIFYING PROCESS

[75] Inventor: Johan L. I. Karlsson, Lidingö, Sweden

[73] Assignee: Boliden Aktiebolag, Stockholm, Sweden

[21] Appl. No.: 905,972

[22] Filed: Sep. 11, 1986

[30] Foreign Application Priority Data

Sep. 16, 1985 [SE] Sweden ............................ 8504289

[51] Int. Cl.⁴ .............................................. C02F 3/30
[52] U.S. Cl. ................................... 210/605; 210/630; 210/631; 210/903
[58] Field of Search ................ 210/605, 630, 631, 903

[56] References Cited

U.S. PATENT DOCUMENTS

| 4,183,809 | 1/1980 | Klapwijk et al. | 210/903 |
| 4,290,884 | 9/1981 | Mandt | 210/903 |
| 4,384,956 | 5/1983 | Mulder | 210/903 |
| 4,559,142 | 12/1985 | Morper | 210/603 |

FOREIGN PATENT DOCUMENTS

| 2337107 | 7/1977 | France | 210/903 |
| 60-97098 | 5/1985 | Japan | 210/605 |
| 60-206498 | 10/1985 | Japan | 210/631 |
| 60-206499 | 10/1985 | Japan | 210/631 |
| 379034 | 3/1972 | Sweden . | |
| 428918 | 10/1976 | Sweden . | |

Primary Examiner—Benoit Castel
Attorney, Agent, or Firm—Burns, Doane, Swecker & Mathis

[57] ABSTRACT

A water purifying method, particularly a sewage purification method, for eliminating nitrogen therefrom, in which (a) the water is subjected to a preprecipitation process with the aid of trivalent and/or multivalent metal salts for prereduction of incoming contaminants; (b) the $NO_3$ present is reduced to nitrogen gas by anaerobic fermentation, in which readily decomposed organic material serves as the carbon source and gives by preprecipitation according to (a) an optimum nitrogen reduction in respect of each sewage category; (c) the ingoing ammonium nitrogen is oxidized to nitrate by aerobic fermentation while simultaneously blowing-off nitrogen-gas bound to the water, wherein water (sewage) that contains nitrate is passed to the reduction stage (b) and bacteria-containing sludge is passed from the aerobic stage to the anaerobic stage, and wherein process stages (b) and (c) can be carried out in any desired order subsequent to step (a).

7 Claims, 3 Drawing Figures

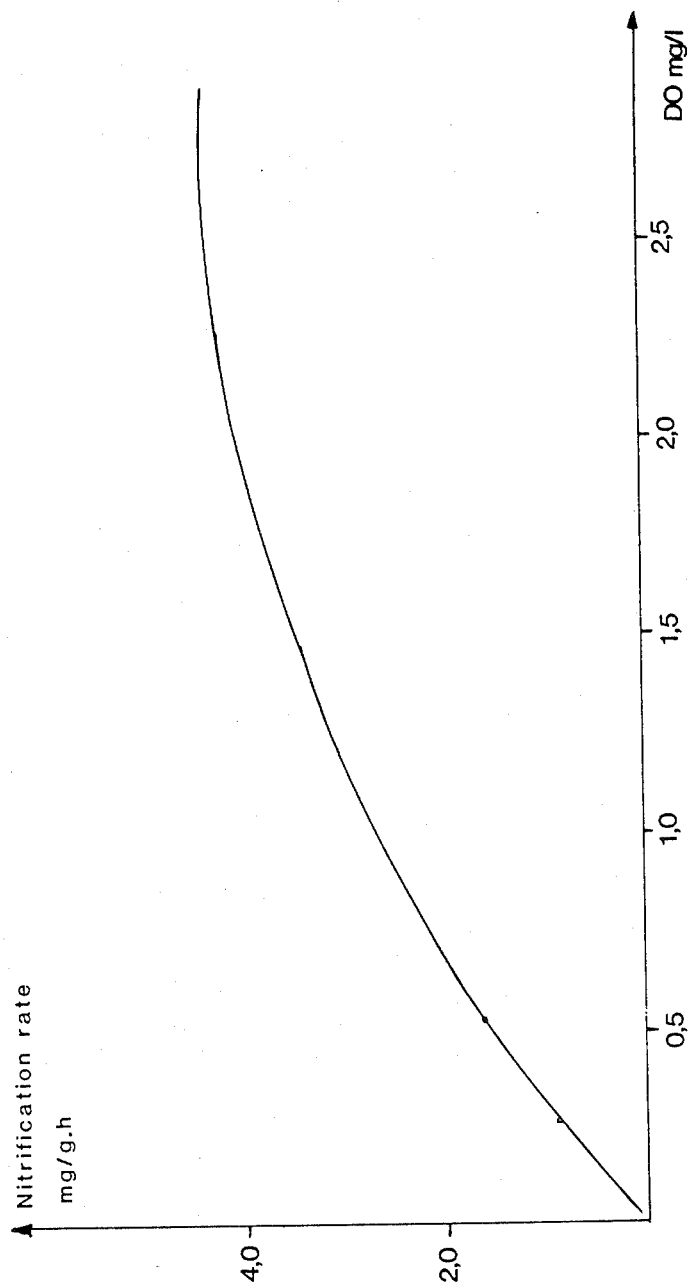

SEWAGE-WATER PURIFYING PROCESS

TECHNICAL FIELD

The present invention relates to a water purification process, and in particular to a process for eliminating nitrogen from sewage.

The object of the present invention is to provide a water purification process particularly intended for eliminating nitrogen from sewage so as to relieve the nitrogen load on our recipients, and in particular on our coastal waters, lakes and waterways.

BACKGROUND OF THE INVENTION

In Sweden, the majority of the local Swedish Waterway Authorities have maintained that phosphorous is the limiting factor of biological plant growth. The part played by phosphorous in this regard has been the topic of progressive discussion in recent years, particularly with respect to its influence in the environment of the coastal waters of Sweden. Nitrogen oxidation processes, and also nitrogen reduction processes are at present the subject of much scientific study in Sweden. Table 1 below shows different nitrogen sources found in Sweden and Finland.

TABLE 1

|  | Nitrogen Load | | | |
|---|---|---|---|---|
|  | Sweden | | Finland | |
|  | tons/year | % | tons/year | % |
| Natural | 58 000 | 40.5 | 44 300 | 51.0 |
| Forestry and Agriculture | 52 400 | 36.6 | 22 200 | 25.6 |
| Municipal Sewage | 24 900 | 17.4 | 13 000 | 15.0 |
| Industry | 7 550 | 5.3 | 6 900 | 8.0 |
| Fish Farms | 260 | 0.2 | 320 | 0.4 |
|  | Σ 143 310 | | 86 720 | |

Almost half of the nitrogen load on the Swedish environment is derived from "natural" sources, i.e. from meteorological precipitation, erosion, or fixation. 37% is derived from forestry and agriculture, 17% from municipal sewage, and 5% from industrial emission. Fish farming contributes only 0.2% of the total load. Ammonium nitrogen, by which is meant the nitrogen in the ammonium compound, and nitrogen as nitrate are both good plant growth sources. Nitrite is often considered to inhibit biological activities when present in large quantities, since there is then the risk that nitrosoamines will form. Ammonium nitrogen may be poisonous to fish, and may also choke the oxygen in the recipients.

A general review of the various nitrogen processes is given in Table 2 below. Solely municipal sewage, biological oxidation processes, and nitrogen separation processes will be dealt with in the following, since the present invention pertains to the treatment of sewage water. In the absence of pronounced industrial influences, municipal sewage water can be maintained at a normal total nitrogen content of about 40 mg/1.30-50% of this nitrogen is in the form of ammonium nitrogen, while the remaining nitrogen is organically found. The major part of this organically bound nitrogen is converted to ammonium nitrogen in the biological stage.

TABLE 2

| | Methods for the chemical reduction of nitrogen | | | |
|---|---|---|---|---|
| Methods | Influence on | Suitable for | + (pros & cons) | Cost |
| Biological | | | | |
| Nitrification | orgN; $NH_4^+$ | Municipal and industrial sewage | Sensitive process | Relatively expensive |
| Denitrification | $NO_2^-$; $NO_3^-$ | Municipal and industrial water | Dependent on organic carbon | Relatively expensive |
| Assimilation in algae pond | orgN; $NH_4^+$ $NO_2^-$; $NO_3^-$ | Polishing of water of low nitrogen content | Temp. light requires org. carbon | |
| Physical Chemical | | | | |
| Ammonia stripping | $NH_4^+$ | Increase conc. where <80% red. is required | High pH required, ice formation in winter | Extremely expensive |
| Ion exchange | $NH_4^+$; $NO_3^-$ $NO_2^-$ | Drinking water | Process regeneration | Highly expensive |
| Break-point chlorination | $NH_4^+$ | Low residual contents in clean water | Org. chlorine compounds | High operational costs |
| Electrolysis | $NH_4^+$ | | Technical problems | |
| Osmosis Ozone | $NH_4^+$; $NO_3^-$; $NO_2^-$ | High contents clean water | Membrane problems | |
| Precipitation | $NH_4^+$ | High contents $NH_4MgPO_4$ | Requires $PO_4^{3-}$ | |

There is therefore a need for improved elimination of nitrogen from sewage water.

SUMMARY OF PRESENT INVENTION

It has now suprisingly been found possible to improve substantially the elimination of nitrogen from sewage water when treating the sewage in accordance with the present invention, which is characterized by the steps of (a) introducing into the sewage a trivalent and/or multivalent metal salt for preprecipitation and prereduction of contaminants present in the sewage;

(b) reducing any $NO_3$ present to gaseous nitrogen by anaerobic fermentation, in which process readily decomposed organic material serves as a carbon source and affords optimal nitrogen reduction in all categories of water through precipitation in accordance with (a) above;

(c) oxidation of the ammonium nitrogen present to nitrate by means of aerobic fermentation while simultaneously blowing-off nitrogen gas bound in the water, the nitrate-containing sewage being passed to the reduction stage and the bacteria-containing sludge being passed from the aerobic stage to the anaerobic stage, the processes of (b) and (c) being carried out in any desired order subsequent to step (a).

Further characteristic features of the invention are set forth in the relevant claims.

The preprecipitation step enables the amount of organic material present to be drastically reduced, e.g. by up to 70%. This material has the form of carbon which cannot be readily oxidized, and is eliminated from the sewage water. As a result, however, molecularly small carbon sources, e.g. lower alcohols, will remain in the water, and serve as suitable carbon sources in a subsequent denitrification stage. The carbon dioxide formed during the reduction process dissolves in the sewage water, as does also the gaseous nitrogen generated, and is bound to the water. In the nitrification stage/oxidation stage (c), the ammonium nitrogen present is oxidized to nitrite by the *nitrosomonas* present, and to nitrate by the *nitrobacteriaceae* present. The rate of oxidation is lowest in respect of the latter, which results in a low nitrite concentration. Both groups of bacteria utilize inorganic carbon, in the present case the carbon dioxide chemically bound with the sewage water. Since the oxidation process is aerobic, air is supplied which simultaneously strips-off nitrogen-gas chemically bound in the water from the denitrification stage/reduction stage (b).

The nitrification process is described by the following chemical formulae

1
$$NH_4^+ + 1.5\,O_2 \xrightarrow{\text{Nitrosomonas}} NO_2^- + 2\,H^+ + H_2O$$

2
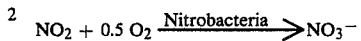
$$NO_2 + 0.5\,O_2 \xrightarrow{\text{Nitrobacteria}} NO_3^-$$

3
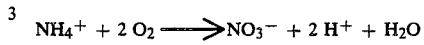
$$NH_4^+ + 2\,O_2 \longrightarrow NO_3^- + 2\,H^+ + H_2O$$

Oxygen demand: 4.6 g O per 1 g N
$CO_2$—demand: Per millimole $NH_4$—N there is released 2 millimole $H^+$ which corresponds to 2 milliequivalents or 120 mg $HCO_3^-$.

As beforementioned there are two families of organisms which are each responsible for different oxidation processes. These families include *nitrosomonas*, which converts nitrogen to nitrite, and *nitrobacteriaceae* which converts nitrite to nitrate. The rate of oxidation is lowest in the case of *nitrosomonas*, and hence the nitrite concentraton, which may be generally suppressive in biological terms, is low. Both groups of bacteria are autotrophic, i.e. they utilize inorganic carbon as a carbon source, in this case carbon dioxide. As illustrated by the above formulae, nitrification has a high oxygen demand. 4.6 g of oxygen are consumed for each gram of nitrogen oxidized. Hydrogen-ions are liberated during the process of oxidation. Theoretically, the alkalinity is lowered by 8.7 mg $HCO_3$ (7.1 mg $CaCo_3$) for each milligram of ammonium nitrogen oxidized.

The following factors are of great significance to nitrification processes
1. Carbon/nitrogen ratio
2. Sludge load
3. Temperature
4. Sludge age
5. Oxygen content
6. pH and alkalinity
7. Toxic substances
8. Flow of return sludge The first, and perhaps the most important, of these factors is the ratio of carbon to nitrogen. Heterotrophic organisms derive energy from organic carbon (electron donor), i.e. it is these organisms which break down what we refer to as BOD (Biochemical Oxygen Demand) and COD (Chemical Oxygen Demand). These organisms double in population approximately every thirty minutes and utilize aerobic environmental oxygen in their process (electron acceptor). The nitrifying organisms are autotrophic (utilize bicarbonate or carbonic acid as the source of carbon) and have a very low doubling rate, 10–15 hours. They also consume oxygen in their process of decomposition. If the sewage water contains large quantities of BOD or COD, together with ammonium nitrogen the nitrogen-oxidizing organisms are never able to compete for the oxygen available, since it is produced much too slowly. Compare in this respect the fourth factor in the aforegoing list=sludge age. If, on the other hand, the ratio of carbon to nitrogen is lowered, the proportion of nitrifying organisms increases since there is less competition for the oxygen available. This can be observed, for example, in biobeds, in which the sludge skin on the upper part of the bed comprises solely heterotrophic organisms, whereafter the proportion of nitrogen oxidizing organisms increases progressively the further down in the bed the sludge skin is studied. In this self-regulating system, the age of the sludge also increases further down in the bed. In order to achieve nitrification in a biological system, it is first necessary to reduce BOD before nitrification commences. This means that in a combined system the BOD-load must be low per unit of surface area. This requires large structural volumes. According to U.F.EPA ("Process design manual for nitrogen control", technical transfer report 1975) nitrification bacteria do not begin to multiply in an activated sludge stage in a manner to achieve good nitrification until the $BOD_5$/TNC ratio is less than 2. Normal total nitrogen contents prior to a biostage can be assessed as about 30 m/l. Thus, $BOD_5$ should be less than 60 mg per liter. Preprecipitation reduces the incoming BOD-contents by up to 75%. In Sweden the normal $BOD_5$-content of incoming sewage water is from 150–250 mg per liter. By applying preprecipitation it is possible to reduce this content to 40–100 mg per liter. We have established that the lower the ratio of BOD to TNC, the higher the degree of nitrification achieved.

It can be seen from FIG. 1 how the nitrifying organisms increase in number at lower BOD/TNC ratios. Normal sewage water subjected to a presedimentation process donates to the biostage about 150 g BOD. With total nitrogen contents in the biostage of 30, this results in a carbon/nitrogen ratio of 5. Preprecipitation, and therewith a halving of BOD to the biostage, gives BOD a ratio of about 1.3. In this case the number of organisms has increased almost two and a half times. In addition, the lower the ratio prior to preprecipitation, the greater the proportion of nitrifying organisms which can be achieved when preprecipitating at the same proportional reduction of BOD. In FIG. 1 there is marked an area in which the BOD/TNC-ratio lies between 1 and 3. This ratio is normal when nitrifying in separate biostages. It will be seen that preprecipitation in accordance with the invention can produce this ratio.

When the preprecipitation stage (stage a) is combined not solely with the nitrogen oxidation stage (stage c), but also with the nitrogen reduction stage (stage b) as a predenitrification process, the BOD/TNC-ratio will be still lower. This is touched upon later, during the discussion of denitrification.

The sludge load is a parameter used when dimensioning a particular sewage purification works. The lower the sludge load, the better the conditions for nitrification in general. The sludge load is calculated with the aid of the following formula.

$$Å = \frac{V \cdot SS}{Q_o \cdot SS_o + Q \cdot SS_u}$$

where
V = aeration volume m$^3$
$Q_ö$ = aeration volume m$^3$/calendar day
$SS_ö$ = aeration volume kg/m$^3$
$SS_u$ = outgoing suspension kg/m$^3$
Q = flow m$^3$
SS = aeration kg/m$^3$ The sludge content is able, within certain limits, to regulate the sludge load, although excessively high contents are liable to significantly impair the properties of the sludge. Consequently, when dimensioning the purification works large tank volumes are incorporated, in order to obtain low sludge loads and nitrification. This results in high investment costs. The reader is again referred to the factor of sludge age. It is possible to lower BOD entering the biostage, by preprecipitating with trivalent metal-ions. When the load on the biostage is halved, the sludge load is also halved. This corresponds to halving the aeration volume. The possibility of achieving nitrification can thus be created in existing works and purification plants where nitrification is not readily achieved. In order to achieve all-year-round nitrification, the sludge load must fall below 0.2 kg BOD per kg of sludge and calendar day, as a rule of thumb. Recommended maximums for BOD$_5$-loads per 1000 m$^3$ and calendar day have been placed at 320 kg.

Figure 2:
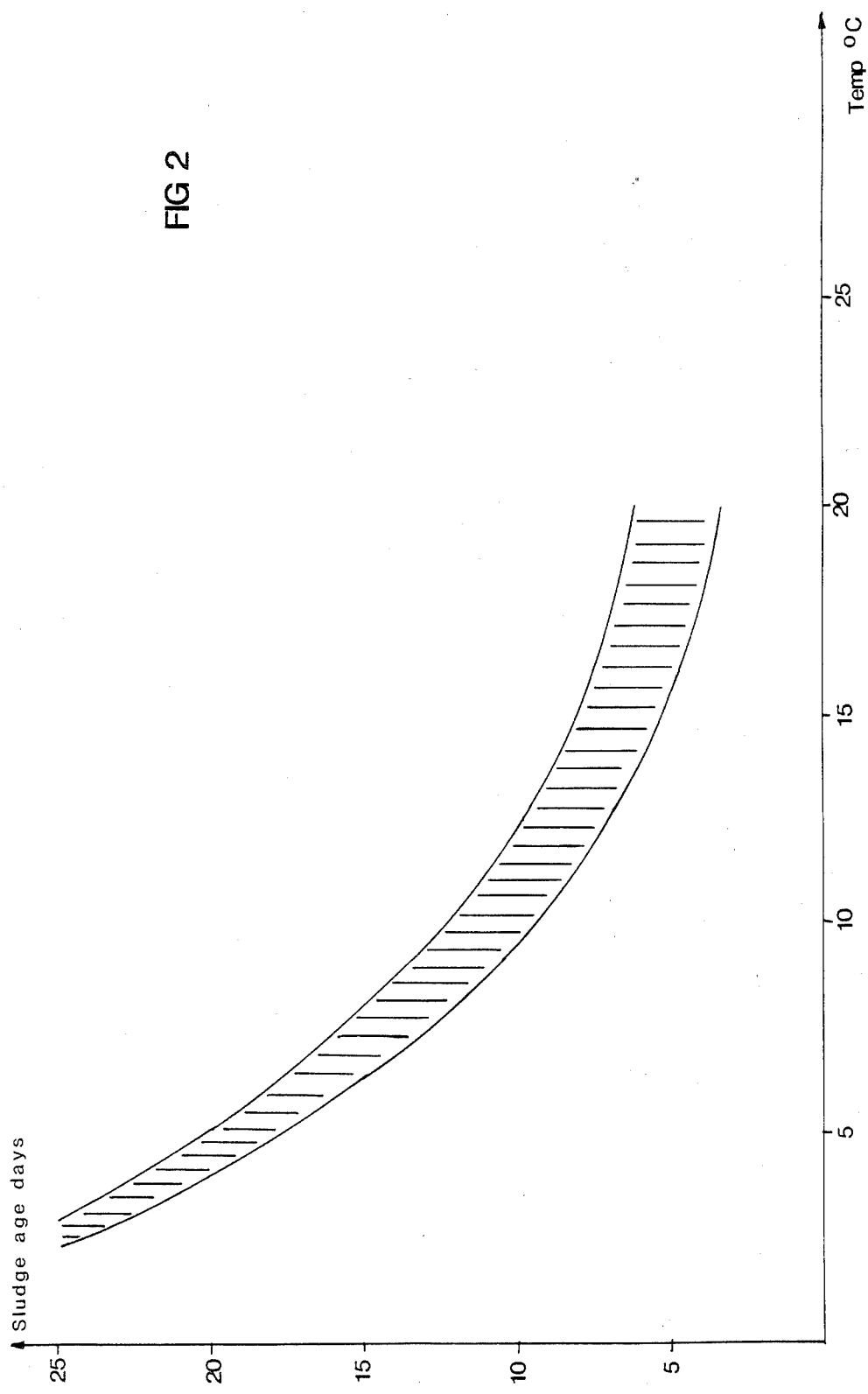

Another important parameter significant to the process of nitrification is temperature. A number of Swedish purification plants are able to nitrify during the warmer half of the year, but lose this ability during the winter months, despite the fact that all operational conditions are the same in both periods, that is with the exception of temperature. FIG. 2 (according to Knowles, Downing) shows clearly the relationship between nitrification and temperature. Nitrification does not cease in any way at temperatures below 10° C., but can be maintained by, for example, strengthening the important parameter sludge-age. Sludge-age is influenced by sludge production; it is more difficult to obtain a high sludge-age with sewage water that contains a high proportion of organic contaminants than with sewage water that contains smaller quantities of organic substance, due to high sludge production. When remaining parameters, with the exception of BOD, are constant, sewage water with and without presedimentation will result in a higher sludge-age and a lower sludge load. Preprecipitation affords a highly important opportunity of regulating sludge-age. With the same sludge-load, e.g. 0.2 kg BOD per kg sludge, the sludge-age in the case of a purification plant with no presedimentation stage is about four days, and with a presedimentation stage about seven days, while with the inclusion of a preprecipitation stage the sludge-age increases to about twelve days. Conversely, a sludge-age of ten days in a purification plant which does not employ a presedimentation stage results in a sludge load of 0.09, whereas the sludge load reached with presedimentation is about 0.15, and with preprecipitation about 0.25 kg BOD per kg sludge. Naturally this is due to the decrease in sludge production when not-readily decomposed suspended substances precipitate out. Similarly, the sludge-age decreases radically at the same sludge load when simultaneous precipitation occurs. For example, when 100 g of heptahydrate are introduced simultaneously, 20 grams thereof, calculated as divalent iron, will result in about 40 grams of sludge. If the biostage is loaded with 90 g BOD$_7$ and these are converted in the aerobic oxidation process to 45 grams of sludge, there is obtained a sludge-age of about seven calendar days in the absence of simultaneous precipitation. In the case of simultaneous precipitation it is necessary to take from the hydroxide sludge the previous 45 grams plus the further 40 grams, i.e. 84% more sludge has to be removed. This lowers the sludge-age to about four days at the same sludge load. In other words, there is a serious risk that nitrification will be lost at low sewage temperatures. If, on the other hand, the preprecipitation stage according to the invention is applied, and 70% of the BOD and all the metal sludge is isolated in the presedimentation stage, the sludge-age is increased to all of 12.5 calender days, i.e. there can be obtained with water having a temperature of about 7° C. the same degree of nitrification as that obtained with water having a temperature of 12° C. in a conventional biostage which does not incorporate preprecipitation. In the case of simultaneous precipitation, the temperature of the water must be about 18° C.

Nitrification is an oxygen demanding process and according to the above reaction formulae there is consumed 4.6 grams of oxygen for each gram of nitrogen that is oxidized. In other words, in the case of 20–40 grams of ammonium nitrogen, the oxidation process consumes between 90–180 grams of oxygen for each cubic meter of water, i.e. in the same order of magnitude as for the carbon oxidation process. The oxygen present has an inhibiting effect when dissolved in quantities below two milligrams (2 mg) for each liter of water. See FIG. 3, which illustrates the significance of dissolved oxygen. There is also a reason in this case to relieve as much of the BOD as possible prior to the biostage by preprecipitation, in order to "conserve" oxygen until the nitrogen oxidation stage. The extent to which oxygen can be supplied to the process is often restricted by the air-blowers or by the capacity of the compressors. In addition, if part of the organically bound nitrogen can be separated out by preprecipitation, this nitrogen is not converted to ammonium nitrogen in the biostage and will not therefore consume oxygen in the subsequent oxidation process. It has been found that in a later stage, during denitrification, it is possible to recover a large part of the oxygen present in the nitrate.

The pH of the sewage water, which in turn is dependent on the alkalinity of the water, is significant to the rate of nitrification. Optimum values lie immediately above pH 8. No difference can be readily discerned in the rate of values between pH 7 and 8.5. Hydrogen-ions are released during the nitrification process, as mentioned in the aforegoing. 0.14 grams of hydrogen-ions are released for each gram of nitrogen oxidized. That is to say, when 30 grams of ammonium nitrogen are oxidized, the alkalinity of the water is lowered by 4.3 equivalents. When the water is weakly buffered, the pH is also lowered and enables nitrification to be inhibited. It is indicated, however, that the nitrification system can be adapted to enable good results to be obtained even with low pH-values. The alkalinity of the water is also lowered when adding chemicals to effect the aforesaid preprecipitation process. A dosage of 100 g AVR will lower the alkalinity by 0.6 equivalents. In certain cases inexpensive, finely-divided calcium carbonate affords a good solution in this regards. As described hereinafter, denitrification restores half of the buffer capacity lost during nitrification.

The autotrophic organisms are sensitive to a large number of substances and are in fact more sensitive than the carbon oxidizing organisms. Table 3 below presents a list of the most commonly occurring substances which are poisonous to nitrifying organisms. In the case of copper, zinc and cobalt, inhibition begins as low as 0.05 mg/l. It was found when running nitrification tests in a pilot plant that an inhibiting effect was also obtained with simultaneous precipitation with iron sulphate in quantities above 20 g $Fe^{2+}$ for each cubic meter of water.

TABLE 3

| Metals | mg/l | Organic Substances | ppm |
|---|---|---|---|
| Cu | 0.05 | Phenol, Cresol | 15 |
| Zn | 0.08 | Oxidation agent | |
| Mn; Ca | 50 | Chlorine | 20 |
| Co | 0.08 | Hydrogen peroxide | 25 |
| Ni | 0.5 | | |
| Na | 2000 | | |

Toxic Substances

At higher pH-values the ammonium nitrogen, which at times is toxic to fish, is converted to nitrate in the nitrification process. It is evident from the nitrogen cycle, however, that this nitrogen as nitrate is a splendid nitrogen source for plant growth. For the purpose of reducing the nutrition content and to chemically reduce the nitrogen present in the water, the nitrate oxygen can be used in a so-called denitrification process in which the nitrogen can be evacuated in the form of nitrogen gas. This can be effected in the main in accordance with two major principles, such as post-denitrification and ante-denitrification.

When the water is otherwise free of oxygen, the nitrate takes the place of oxygen as an electron acceptor, that is to say anoxic conditions prevail. In the post-denitrification process there is used an anoxic zone, i.e a zone in which no oxygen is present and in which the water is solely agitated for denitrification, whereafter the nitrogen gas is evacuated in a terminal ventilating stage. It may be necessary in certain circumstances to add a readily-decomposed carbon source to the system at this stage, suitably in the form of methanol, since all carbon has been consumed in the previous ventilating stage.

In the case of large volumes of water, the so-called endogenic respiration can serve as a source of carbon.

Since no oxygen other than nitrate-bound oxygen is present, the microorganisms utilize this oxygen. If there is now introduced a non-aerated zone prior to the aerated stage, it is possible to carry out a pre-denitrification process, in which the incoming non-precipitated organic material is then used as the carbon source.

The following formula, which describes the total nitrification and denitrification cycle, discloses that theoretically at most 60% of the oxygen supplied in the nitrification process can be recovered from the nitrate.

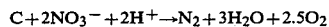

$$C + 2NO_3^- + 2H^+ \rightarrow N_2 + 3H_2O + 2.5O_2$$

$$1/28 \rightarrow X/80$$

X = 2.9 g oxygen per gram of chemically reduced nitrogen

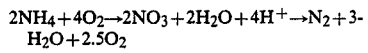

$$2NH_4 + 4O_2 \rightarrow 2NO_3 + 2H_2O + 4H^+ \rightarrow N_2 + 3H_2O + 2.5O_2$$

~60% of the oxygen can be recovered.

In the case of carbon derived from endogenic respiration, about 2 grams of sludge are used for each gram of nitrogen. This increases to about 2.5 grams sludge per gram nitrogen when methanol is added. In the process of pre-denitrification 3–5 g BOD are consumed for each gram of nitrogen.

FIG. 4 illustrates the rate of denitrification with differing carbon sources. The fastest rate is that achieved with methanol, and the slowest is that achieved with endogenic respiration. When the incoming sewage is used as the carbon source, denitrification takes place at a rate which covers a wider spectrum, the span of which depends on the composition of the sewage. Small dissolved molecules give a higher denitrification rate than suspended or large molecular substances. BOD or COD, as the carbon is expressed, is a very poor source of information, since it does not divide into terms which disclose how readily it is able to decompose, or indeed in any other term. In the case of chemical precipitation, the suspended and the large molecular part of the BOD can be precipitated out, whereas the more readily decomposed low molecular part thereof is unaffected. The chemical precipitation process functions as a sieve, i.e. divides the BOD into its various fractions. This sorting effect is of considerable significance, since the rate of denitrification is then the highest conceivable for predenitrification.

Standard sewage contains 200 grams of BOD. Of this amount the not-readily oxidized part is separated out in the pre-sedimentation stage, normally about 75%. From 50 grams to the major part of the dissolved readily-decomposed BOD fraction is carried over to the predenitrification phase of the biostage. The same standard sewage contains 30 grams of ammonium nitrogen, which is oxidized in the nitrification phase of the biostage. This requires 135 grams of oxygen for each cubic meter of water (sewage). It is possible theoretically to recover 60% of this oxygen, i.e. about 85 grams of oxygen, i.e. the 50 grams required in the prenitrification process balances well with the nitrate oxygen. Thus, when practising the method according to the invention, both BOD and nitrogen reduction can be effected at substantially the same oxygenation costs. All BOD is now oxidized in the denitrification stage. No carbon enters the oxygen-rich stage, and hence the BOD/TNC-ratio is very low. This falls well within the values recommended by EPA in two stage biological purification processes. The premises for constructing a nitrification system are therewith extremely good. When applying pre-denitrification in the absence of preprecipitation, denitrification will occur, since the readily decomposed BOD is primarily used. The remainder of the BOD will enter the aeration process and commandeer oxygen, besides influencing the BOD/TNC-ratio so as to limit the number of nitrifying organisms in relation to the preprecipitation system. In addition, this BOD-load results in sludge which must be removed from the system. A high sludge-age is more difficult to maintain.

The inadequacy of the preprecipitate or chemical precipitate to precipitate-out the small molecular, dissolved organic substances has beome its strength in the present purifying process.

Thus, without enlarging the structural volume of the purification works there is obtained in this total purifying process a 90%-reduction in BOD, a 90% suspension reduction, a 90% chemical reduction of nitrogen, a 90% phosphorous reduction, an increased gas production during putrefaction, and a phosphorous-enriched sludge.

I claim:

1. A method for purifying water containing organic material by reducing the nitrogen content of the water comprising:
   (a) subjecting the water to preprecipitation by adding a multivalent metal salt, separating the precipitate so as to reduce the BOD content by up to 75% and thereby reduce the $BOD_5$ to total nitrogen content ratio, and subsequently subjecting the water to steps (b) and (c) in any order wherein (b) and (c) are as follows;
   (b) subjecting the water to anaerobic fermentation using the organic material in the water as a carbon source so as to reduce nitrate present in the water to nitrogen gas;
   (c) subjecting the water to aerobic fermentation while simultaneously stripping nitrogen gas from the water; and
   (d) passing bacteria-containing sludge from the aerobic fermentation step to the anaerobic fermentation step.

2. The method of claim 1 wherein the multivalent salt is comprised of a trivalent metal salt.

3. The method of claim 1 wherein the carbon content of the water is reduced by the preprecipitation step so as to balance the nitrogen content in step (b).

4. The method of claim 3 wherein the preprecipitation step reduces the $BOD_5$ to between 40 and 100 milligrams per liter.

5. The method of claim 4 wherein the water subjected to step (c) has a $BOD_5$ of less than 60 milligrams per liter.

6. The method of claim 1 wherein the ratio of $BOD_5$ to total nitrogen content of the water subjected to step (c) is less than 2.

7. The method of claim 1 wherein the steps are conducted in the sequence of (a), (b) and (c).

* * * * *